US010127362B2

(12) United States Patent
Bennett et al.

(10) Patent No.: US 10,127,362 B2
(45) Date of Patent: Nov. 13, 2018

(54) POOL MOBILE UNITS

(71) Applicants: James Duane Bennett, Hroznetin (CZ); Bindu Rama Rao, Laguna Niguel, CA (US)

(72) Inventors: James Duane Bennett, Hroznetin (CZ); Bindu Rama Rao, Laguna Niguel, CA (US)

(*) Notice: Subject to any disclaimer, the term of this patent is extended or adjusted under 35 U.S.C. 154(b) by 0 days.

(21) Appl. No.: 15/622,554

(22) Filed: Jun. 14, 2017

(65) Prior Publication Data

US 2017/0365150 A1 Dec. 21, 2017

Related U.S. Application Data

(60) Provisional application No. 62/350,187, filed on Jun. 15, 2016.

(51) Int. Cl.
*G08B 23/00* (2006.01)
*G06F 21/10* (2013.01)
(Continued)

(52) U.S. Cl.
CPC ......... *G06F 21/10* (2013.01); *A01D 34/008* (2013.01); *A01D 34/64* (2013.01); *A01D 43/16* (2013.01); *A47L 7/00* (2013.01); *A47L 9/2805* (2013.01); *A47L 9/2852* (2013.01); *A47L 9/2857* (2013.01); *A47L 9/2894* (2013.01); *E04H 4/06* (2013.01); *E04H 4/1654* (2013.01); *G05D 1/0088* (2013.01); *G05D 1/0291* (2013.01); *G06N 99/005* (2013.01); *G06Q 30/016* (2013.01); *G06Q 30/0601* (2013.01); *G08B 17/10* (2013.01); *G08B 21/08* (2013.01); *H04L 63/0428* (2013.01); *H04L 63/20* (2013.01); *H04L 67/104* (2013.01); *H04L 67/12* (2013.01); *H04N 21/414* (2013.01); *A01D 43/00* (2013.01);
(Continued)

(58) Field of Classification Search
CPC ......... G08B 21/08; E04H 4/06; E04H 4/1654; H04L 67/12; H04N 21/414
See application file for complete search history.

(56) References Cited

U.S. PATENT DOCUMENTS 9,672,716 B2 * 6/2017 Carroll ................. G08B 21/088
2004/0092181 A1 * 5/2004 Porat ...................... B63B 22/24
441/136

(Continued)

*Primary Examiner* — Joseph Feild
*Assistant Examiner* — Rufus Point
(74) *Attorney, Agent, or Firm* — Garlick & Markison; Bruce E. Garlick

(57) ABSTRACT

A network of modular, multitier pool mobile units, that wander around and under water of a swimming pool. The pool mobile units monitor for safety, emergency and accident related events and undertakes appropriate actions, scrub and clean the swimming pool, emit chemical agents to sanitize the swimming pool water, and may play music. The pool mobile units may simply operate on the pool surface, be fully submersible, or semisubmersible. A central server manages a plurality of multitier pool mobile units in a plurality of swimming pools, supports music download, and provides experience based resources for the multitier pool mobile units. The central server provides experience based resources in the form of safety, emergency and accident supports. The user can configure the parameters of both pool mobile unit and the central server.

20 Claims, 9 Drawing Sheets

(51) Int. Cl.
*A01D 34/00* (2006.01)
*A01D 34/64* (2006.01)
*A01D 43/16* (2006.01)
*A47L 7/00* (2006.01)
*A47L 9/28* (2006.01)
*G05D 1/00* (2006.01)
*G05D 1/02* (2006.01)
*H04L 29/08* (2006.01)
*E04H 4/06* (2006.01)
*E04H 4/16* (2006.01)
*G08B 21/08* (2006.01)
*H04N 21/414* (2011.01)
*G06Q 30/00* (2012.01)
*G06N 99/00* (2010.01)
*G06Q 30/06* (2012.01)
*G08B 17/10* (2006.01)
*H04L 29/06* (2006.01)
*A01D 101/00* (2006.01)
*G06Q 10/00* (2012.01)
*A01D 43/00* (2006.01)

(52) U.S. Cl.
CPC ....... *A01D 2101/00* (2013.01); *A47L 2201/00* (2013.01); *A47L 2201/022* (2013.01); *A47L 2201/04* (2013.01); *G06F 2221/0746* (2013.01); *G06Q 10/20* (2013.01)

(56) References Cited

U.S. PATENT DOCUMENTS

| | | | | |
|---|---|---|---|---|
| 2004/0173542 | A1* | 9/2004 | Porat | C02F 1/78 210/760 |
| 2006/0223394 | A1* | 10/2006 | Porat | B63B 22/24 441/136 |
| 2007/0106403 | A1* | 5/2007 | Emery | C02F 1/008 700/90 |
| 2009/0301522 | A1* | 12/2009 | Abehasera | E04H 4/1654 134/18 |
| 2010/0299016 | A1* | 11/2010 | Benzler | G05D 1/0246 701/26 |
| 2012/0222997 | A1* | 9/2012 | Potucek | H02J 5/005 210/167.18 |
| 2015/0362925 | A1* | 12/2015 | Uy | G05B 15/02 700/282 |
| 2016/0340006 | A1* | 11/2016 | Tang | B63C 9/01 |
| 2017/0167151 | A1* | 6/2017 | Segal | B63C 9/02 |
| 2017/0212523 | A1* | 7/2017 | Witelson | G05D 1/0274 |

\* cited by examiner

POOL MOBILE UNITS

CROSS REFERENCES TO RELATED APPLICATIONS

The present U.S. Utility patent application claims priority pursuant to 35 U.S.C. § 119(e) to U.S. Provisional Application No. 62/350,187, entitled "Modular Mobile Units," filed Jun. 15, 2016, which is hereby incorporated herein by reference in its entirety and made part of the present U.S. Utility Patent Application for all purposes.

BACKGROUND

1. Technical Field

The present invention relates generally to robots, and, more specifically, aquatic swimming pool robots.

2. Related Art

There are many types of robots available commercially today, some of them do specialize on swimming pools, for example, Blue Wave®, Aquabot® and Dolphin®. These robotic pool cleaners vacuum and clean waters. Their limited functionalities include pool cleaning by vacuuming, scrubbing the walls and bottom surfaces, filtering the water and auto shutoff after the work is done.

These are submersible pool cleaners, they work on electricity with a long water cleaning and electric wired pipe connected to it, from a carry cart. They come with a remote control that sets water cleaning time (such as one hour, two hours and three hours) and all of their functioning is pre-programmed. They do not drain water and refill later on, they recycle water, thereby saving the valuable water resources.

Other types of robotic cleaners available today, some of them only clean swimming pool water and bottom and wall surfaces, while others are not submersible. The latter ones only clean indoor of homes, they come in the form of vacuum cleaners.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
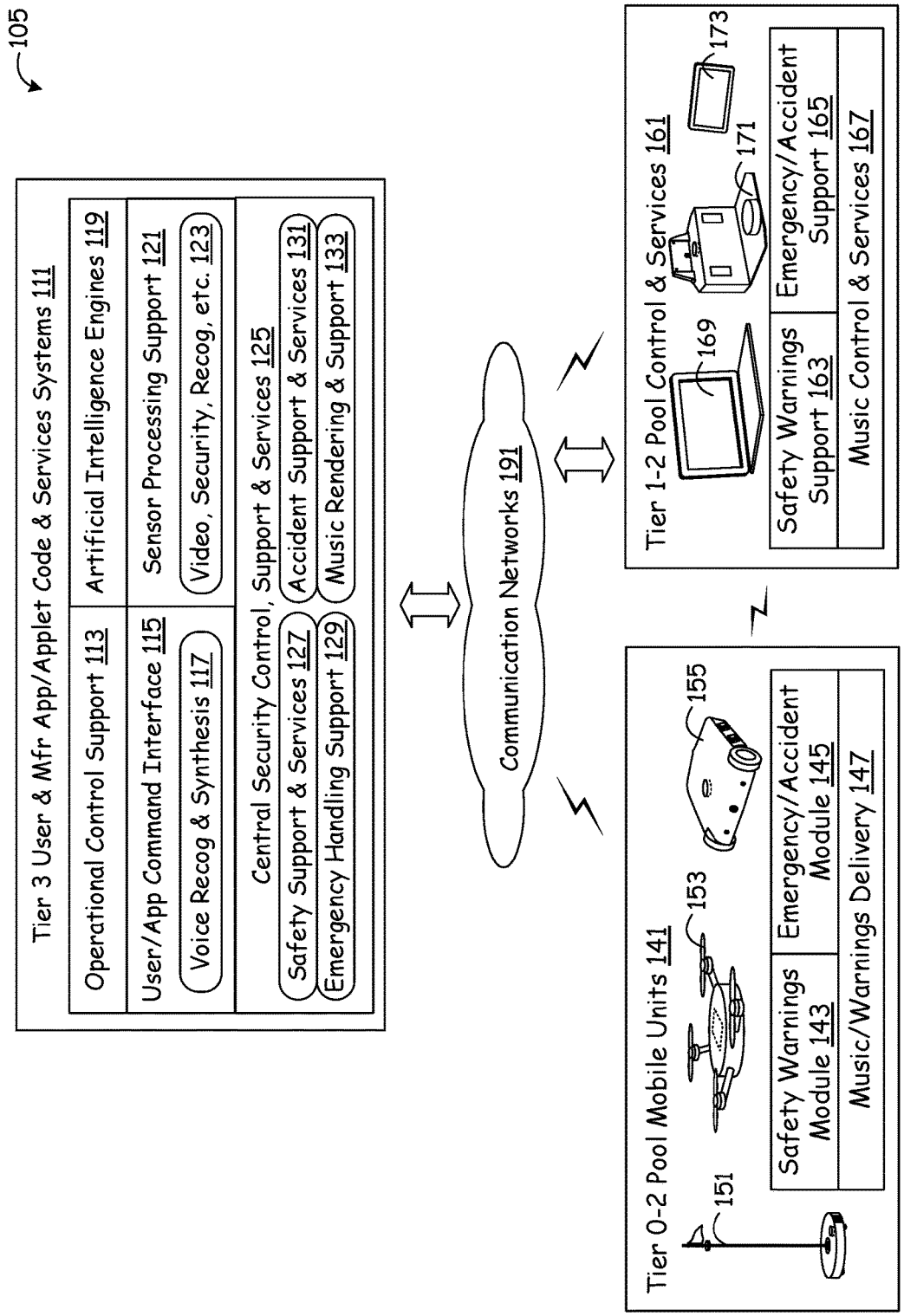
FIG. 1 is a perspective block diagram of pool mobile unit infrastructure, wherein the pool mobile units manage entire day-to-day operations of swimming pools as well as monitor the swimmers and bystanders for the safety, emergency and accidents in the swimming pools.

FIG. 1 is a perspective block diagram of pool mobile unit infrastructure 105, wherein the pool mobile units manage entire day-to-day operations of swimming pools as well as monitor the swimmers and bystanders for the safety, emergency and accidents in the swimming pools. In specific, the pool mobile units (PMU) 141 remove leaves and other stuff that fall onto the swimming pools (pools, hereon), scrub and clean pool surfaces, clean water, sanitize pool, provide safety warnings, attend accidents and emergencies while in the pool, and deliver music. The pool mobile units 141 shown in the depiction are flag pole pool mobile unit 151, drone pool mobile unit 153 and submersible pool mobile unit 155. Many other configurations or designs of the pool mobile units 141 are also contemplated. They are designed to perform as tier zero (T0), tier one (T1) and/or tier two (T2) pool mobile units 141. In general, there are two types of the pool mobile units 141, those that reside in the pools (on surface or submerged) and those that function by moving around the pool edges (but not get into the water). The combination of these two types are also contemplated, for example, the submersible pool mobile unit 155 shown in the depiction.

The pool mobile units 141 have many built-in functionalities that they can perform all by themselves, without any external support. For example, they can provide safety warnings, attend emergencies and/or accidents and deliver music when not submerged. They can take voice commands and respond to the users (interact with users via voice recognition and voice synthesis, with the swimmers and other family members) as needed.

To perform these functions, they have safety warning module 143, emergency/accident module 145 and music/warnings delivery module 147. The safety warning module 143, emergency/accident module 145 and music/warnings delivery module 147 also interact with intermediate tiered, tier 1-2 pool control and services 161 to perform the above-said functions. The tier 1-2 pool control and services 161 can be everyday household devices such as personal/laptop computers 169, smartphones or custom-built handheld devices 173 and/or custom-built devices 171 that incorporate a pluggable and detachable processing unit (or brain unit). These devices 169, 171, 173 contain safety warning support module 163, emergency/accident support module 165 and music control and services module 167.

When the firmware or software related to the tier 0-2 pool mobile units 141 (lower tiered) cannot all by themselves complete a task, they seek assistance from the tier 1-2 pool control and services 161 (intermediate tiered) and complete the task in that way. For example, if safety warnings module 143 cannot complete a task that requires heating of the pool during winter, it may request safety warnings support module 163, which in turn controls heating of the pool. At the same time, the safety warnings module 143, via speakers of music/warnings delivery module 145, warns the people before they dive into the pool that water is too cold for swimming and that water is getting heated up. Similarly, emergency/accident module 145 takes assistance from the emergency/accident support module 165 and music/warnings delivery 147 takes assistance from the music control and services 167.

Both the tier 0-2 pool mobile units 141 and tier 1-2 pool control and services 161 interact with tier 3 user and manufacturer app/applet code and services systems (a cloud based central support and services server system) 111, whenever need arises for completion of a task or when a task is initiated by the latter. For example, if a swimmer requests a submersible pool mobile unit 155 for specific song/music, or specific swim related assistance, or weather predictions and if such a request cannot be fulfilled by either tier 0-2 pool mobile units 141 and tier 1-2 pool control and services 161, then they forward the request to the tier 3 user and manufacturer app/applet code and services systems 111. In return, the tier 3 user and manufacturer app/applet code and services systems 111 provide support and assistance for the request and the swimmer gets his or her song/music, swim related assistance or weather predictions, all within few seconds. For this, the tier 3 user and manufacturer app/applet code and services systems 111 make use of music rendering and support 133, artificial intelligence engines 119, user/app command interface 115 and operational control support 113, in totality.

In general, the tier 3 user and manufacturer app/applet code and services systems 111 consists of operational control support 113, user/app command interface 115, artificial intelligence engines 119 and sensor processing support 121. The user/app command interface 115 in turn consists of voice recognition and synthesis 117, and the sensor processing support 121 consists of video, security, recognition, etc. module 123. The voice recognition and synthesis 117 does one important function, that of recognizing the swimmer and authenticate him or her, whether they are authorized to use the pool or not. Similarly, the tier 3 user and manufacturer app/applet code and services systems 111 can also identify faces to perform the same function.

Furthermore, the tier 3 user and manufacturer app/applet code and services systems 111 also contain pool mobile units 141 specific functionalities, that include central security, support and services 125. The central security, support and services 125 in turn consists of many modules that assist the tier 0-2 pool mobile units 141 and tier 1-2 pool control and services 161, they include safety support and services 127, emergency handling support 129, accident support and services 131 and music rendering and support 133.

The music rendering and support 133 controls and provides support to the tier 0-2 pool mobile units 141 for all music related task completions, that include music selection and delivery (based upon the swimmers in the pool, after identifying the swimmers via face or voice recognition). The accident support and services 131 provides accident related support such as identifying type of accident, determining the cause of accident, identifying the swimmer(s) or others getting hurt, seriousness of the hurting and informing people inside the home as well as authorities outside the home (by utilizing the voice synthesis facility of voice recognition and synthesis 117, for example). Similarly, the emergency handling support 129 allows the swimmers and bystanders to get emergency assistance such as informing them about first aid kits (where they are available and how to use them). The safety support and services 127 provides warnings to the swimmers, such as an impending weather related emergency or the fact that a bystander is too close to the pool edge and so forth.

The pool mobile units 141 (such as those on surface or submerged, submersible pool mobile unit 155 for example) perform many additional tasks such as draining water from the pool, providing chemical treatment to the pool water etc. These are time specific and other restrictions may also apply. For example, providing chemical treatment (by pool mobile units 141) during bright sunlight often leads to higher incidence of unwanted chemical reactions. Moreover, providing chemical treatment during bright sunlight would be more likely to expose in pool goer's to treatment chemical concentrations. Such submersible pool mobile unit 155 uses dimensioned 3D mapping to identify objects at the bottom of pools and can characterize them. The submersible pool mobile unit 155 also identifies humans or pets in need of assistance and call to alert a user. Moreover, they measure exact water volume by dimensioning the pool, measure lumen production of the sun, temperature, chemical content of the pool water, evaluate water clarity, count lifeform concentrations, identify leaves and other objects. Also, from much of this information, the submersible pool mobile unit 155 generates a schedule for servicing and maintaining the pool and supporting pool area safety. In addition, the pool mobile unit can deploy an airbag and move itself and the airbag into range of a struggling swimmer and act as a buoy, then moves the swimmer to the pool edge safely. Alternatively, in one configuration, the submersible pool mobile unit 155 inflates itself under the swimmer and moves toward the edge of the pool or toward shallow end.

Generally speaking, the submersible pool mobile unit 155 rescues by one of three ways, by: a) releasing a floatation device close to swimmer; b) releasing a flotation device and dragging swimmer to edge; and c) inflating itself and approaching swimmer so that swimmer can hang on while propellers propel bot to edge and shallow side.

The submersible pool mobile unit 155 that is configured to be used as a pool robot (or bot) performs lifesaving actions when it determines that a swimmer, such as a child, is unable to swim properly and is drowning. For example, it deploys an inflated pad or an inflated life preserver jacket right below or in proximity to the swimmer, when it detects that the swimmer is in danger. Thus, every pool can deploy this submersible pool mobile unit 155 that acts primarily as an underwater cleaning bot, that also watches swimmers to make sure they are safe, and deploys an inflation portion that can be grabbed by the swimmer when it detects that the swimmer is in danger or needs help. It also communicates notification messages to alert other people in vicinity, and also optionally contacts the police or emergency services to seek help. In a related configuration, the submersible pool mobile unit 155 saves lives by pulling a swimmer's body to a shallow pool side. It can be configured to float up just under the struggling swimmer too and can keep swimming back to help them, then even encircle and pull them to shallow end of the pool and elevate a head of the swimmer in danger.

Moreover, the submersible pool mobile unit 155 can take images and videos when commanded by the users, from under water or on the surface of water or from the edges of the pool. For example, the user can command the submersible pool mobile unit 155, such as, children saying "mobile unit, go under water, to east corner and take video of us playing . . . ," and the submersible pool mobile unit 155 recognizes the voice and responds to the command immediately. The submersible pool mobile unit 155 also performs a plurality of additional secondary duties, such as detecting cracks on the bottom and wall surfaces, detecting temperature of water and the water composition (for example, chlorine content, blood in case of an emergency or accident, other chemical agents). It also informs the swimmers and family members, when there are any abnormalities in the environment of water and air.

If the submersible pool mobile unit 155 spots and identifies animals in the pool, it pushes them to safe territories/sections of the pool. The submersible pool mobile unit 155 spots leaves and debris and collects them and removes them before they begin decaying. It spots items such as glasses, rings and toys at the bottom of the pool and alerts a user for pickup if it cannot handle the pickup. In a related configuration, the submersible pool mobile unit 155 recognizes/identifies screaming humans and children flailing, or recognizes strangely floating conditions of people that appear wrong and takes safety actions, communicating information to help the swimmer. It can detect bumps on heads of swimmers, or detect blood patterns in the water and send out alerts/notifications to warn others and to call for help. The submersible pool mobile unit 155 can also speak instructions to bystanders and those running to find help. In a related embodiment, it facilitates conducting cardiopulmonary resuscitation (CPR) by providing air/oxygen that is pumped into the lungs of a swimmer in distress (or one who has been recovered out of the swimming pool).

Thus, the submersible pool mobile unit 155, while sitting and watching pool chemistry and filtering, actively watches people swimming, while in watch mode. It counts seconds for durations of underwater heads and similar diving activities conducted by a swimmer, knowing that long durations are not possible by humans or animals. It can detect when a swimmer is floating face down in the water for too long.

The submersible pool mobile unit 155 is assembled and/or configured and reconfigured to carry a multitude of several different sensors. The following are some sensors and detection and identification elements whose usage and incorporation is anticipated: a) proximity, range, tilt, motion, accelerometer, compass, gyroscope, GPS; b) rain, snow, temperature, ice, mud; c) ultrasonic; d) acoustic wave; e) infrared (IR); f) ultraviolet; g) multi-microphone; h) barometer; i) smoke, radon, radiation, $CO_2$, carbon monoxide; j) pollen counter; k) video/imager—plus face recognition/detection, human body, pet, objects; l) lumen/ambient light; m) spectrum analyzer; n) PH; o) alkalinity; p) detection and dispensing—chlorine (to disinfect and sanitize pool and other water—kills algae and bacteria) and cyanuric acid (to protect chlorine from UV); q) bacteria, fungus, virus detection and identification; r) algae, microbe detection and identification; and s) 3D depth sensing and dimensioning.

Furthermore, the pool mobile unit 141 is fitted with emitters of different kinds, some of them incorporated by default based on the tasks to be performed by it and the environment it is to be used, while other emitters are plugged in or added by the user for specific tasks. The following are some of the emitter modules: a) flash, spot, headlamps, area lighting as needed by the pool mobile unit 141 sensors or by humans; b) micro-projector; c) IR to support ranging and Google Tango® type 3D mapping for better sensory imager pickup even at night or with lights off or dim; d) UV lamps to disinfect or kill microbes, bacteria and render viruses harmless.

The communication between the tier 0-2 pool mobile units 141 and tier 1-2 pool control and services 161 occur mainly wirelessly (via Wi-Fi or Bluetooth®), because wires can entangle them (or swimmers and bystanders) and cause hazards. Nonetheless, the communication between both the tier 0-2 pool mobile units 141 and tier 1-2 pool control and services 161 and the tier 3 user and manufacturer app/applet code and services systems 111 occurs via communication networks 191, that includes internet, intranet and household wired or wireless communication networks.

It should be clear that the mobile unit modelled after the tier 0-2 pool mobile units 141 takes many forms, such as a boat, a yacht, a submersible, and a semi-robotic or robotic water vehicle. For example, the pool mobile units 141 is anything that is robotic, mobile designed to be used in water, that is capable of data collection and sharing in accordance with the present invention.

Figure 2:
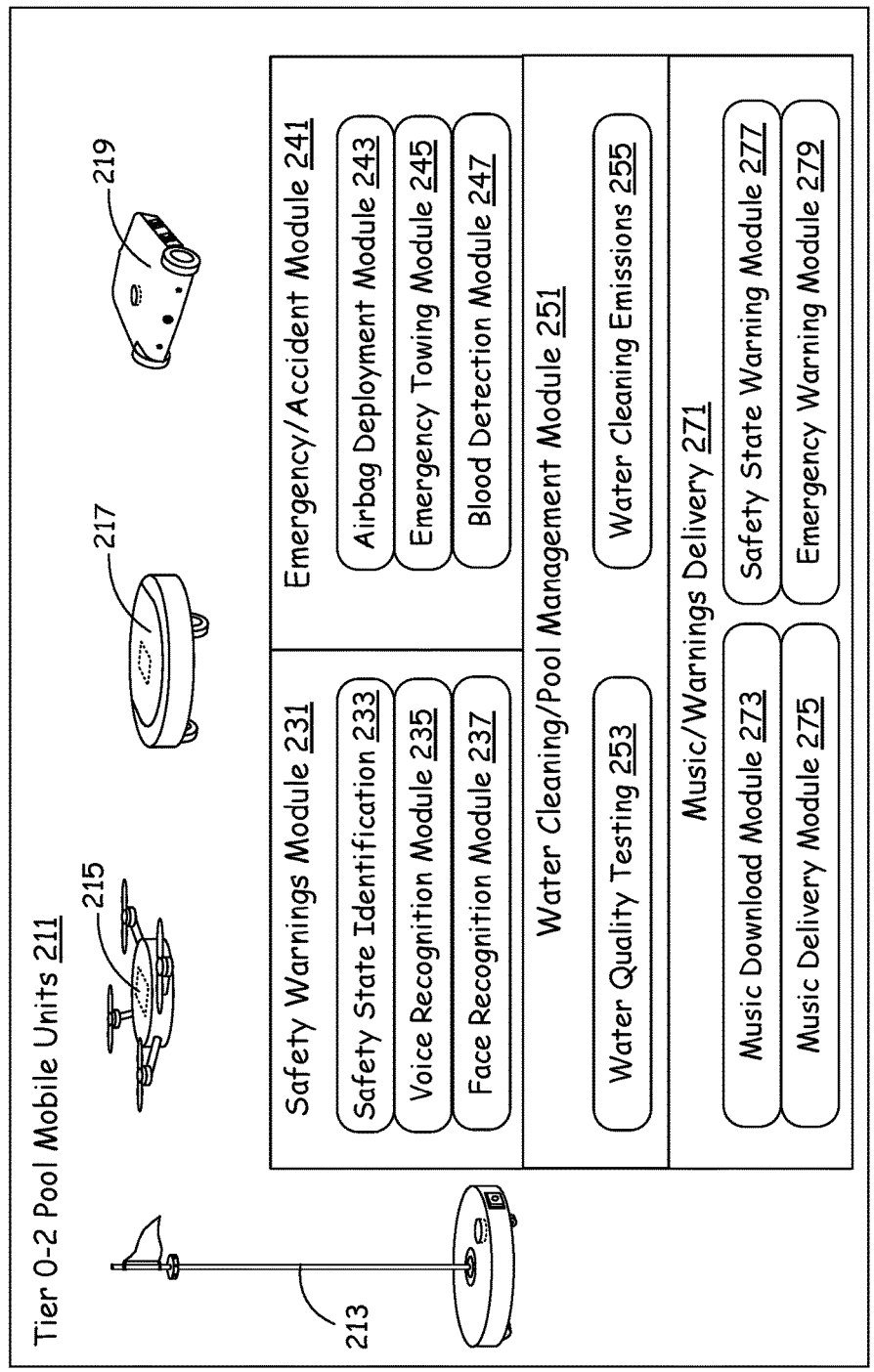
FIG. 2 is a perspective block diagram illustrating tier 0-2 pool mobile units of FIG. 1, in detail.

FIG. 2 is a perspective block diagram illustrating tier 0-2 pool mobile units of FIG. 1, in detail. Many varieties of pool mobile units 211 are configured, they include flag pole pool mobile unit 213, drone pool mobile unit 215, general purpose pool mobile unit 217 and submersible pool mobile unit 219. They are designed to meet many different and specific goals. All of the pool mobile units 211 perform few primary functions such as managing the pool and safeguarding the swimmers and bystanders, while also perform many secondary functions, including taking images and video (and sending them to the cloud) and providing swimmer's favorite music (via built-in speakers or external speakers placed next to the pool).

The flag pole pool mobile unit 213 has a tall pole (in a related configuration, a telescoping pole) containing a camera at the top of it and a processing unit (brain unit) and memory at the bottom. Many other sensors, such as microphones, are also built-in at the bottom or on the pole. The flag pole pool mobile unit 213 is connected to the cloud and has a good camera visibility to watch over the entire area in which the pool also exists. It has wheels and wanders around the pool, while performing its primary and secondary functions. The drone pool mobile unit 215 has the bot capabilities and is typically employed as a supplementary pool mobile unit. It has a good visibility with its telescopic camera and can move around entire pool area. Upon pressed into service by a primary pool mobile unit such as the 217, it moves closer to the swimmer or bystander who is in trouble (in emergency or accident situations) and provides images of the area, and also provides instructions and warnings to them. It also has capability to deliver music and video, such as a television coverage of an important event or breaking news, from the bottom side of it. It can also perform both primary and secondary functions on its own, without a primary pool mobile unit 211 present in the pool or pool area. The general purpose pool mobile unit 217, as the name suggests, fulfills its primary and secondary functions by wandering either by the edges of the pool or on the surface of the pool. The functionalities of the submersible pool mobile unit 219 is explained in detail with reference to the FIG. 1 (the submersible pool mobile unit 155 of FIG. 1).

The tier 0-2 pool mobile unit 211, to perform the above said functionalities, consists of safety warning module 231, emergency/accident module 241, water cleaning/pool management module 251 and music/warnings delivery module 271. The flag pole pool mobile unit 213, drone pool mobile unit 215, general purpose pool mobile unit 217 and submersible pool mobile unit 219, depending on their primary and secondary functionalities, consists of at least some of the above-mentioned modules 231, 241, 251 and 271 or their submodules.

The submodules of safety warnings module 231 include safety state identification 233, voice recognition module 235 and face recognition module 237. The safety state identification module 233 identifies circumstances (or states) of the present time, so that it can initiate a task toward issuing safety warnings to the swimmers or bystanders and initiate processes that involve higher tiered entities such as pool control and services 161 (of FIG. 1) and tier 3 user and manufacturer app/applet code and services systems 111 (of FIG. 1). For example, a child may have jumped into the deep end of the pool and this is a state in which the safety warnings module 231 issues warning to the child, other swimmers close by and bystanders, and loudly announces: "Robert is not authorized enter deep end of the pool, quickly get out of the pool . . . " The voice recognition module 235 and face recognition module 237 identify the voices and faces of different people in the pool and around the pool, so that the safety warnings module 231 can initiate tasks associated with each one around in a personalized manner. In the above-mentioned example, the voice recognition module 235 and face recognition module 237 identify the name Robert based on voice and face recognition.

The emergency/accident module 241 consists of airbag deployment module 243, emergency towing module 245 and blood detection module 247. The airbag deployment module 243 initiates a task of deploying the airbag, as soon as it identifies that the swimmer is in trouble and requires assistance for swimming. Similarly, emergency towing module 245 initiates a task of towing the swimmer to shallow end or even out of the pool, once the pool mobile unit 211 identifies that the swimmer is holding on to the airbag. The blood detection module 247 identifies blood in water and initiates tasks to address various emergency situations.

Furthermore, the submodules of water cleaning/pool management module 251 include water quality testing 253 and water cleaning emissions 255. Some of these functionalities of modules 253 and 255 are possible only by on the surface or submersible pool mobile units (155 of the FIG. 1). Similarly, the submodules of music/warnings delivery module 271 are made up of music download module 273, music delivery module 275, safety state warning module 277 and emergency warning module 279. The music download module 273 downloads music from higher tiered units, depending upon the interests of the individual swimmers and even bystanders, either upon their requests or otherwise. The music delivery module 275 delivers music to the swimmers and bystanders on the pool mobile unit's 211 built-in speakers or separate speakers kept in the vicinity.

Figure 3:
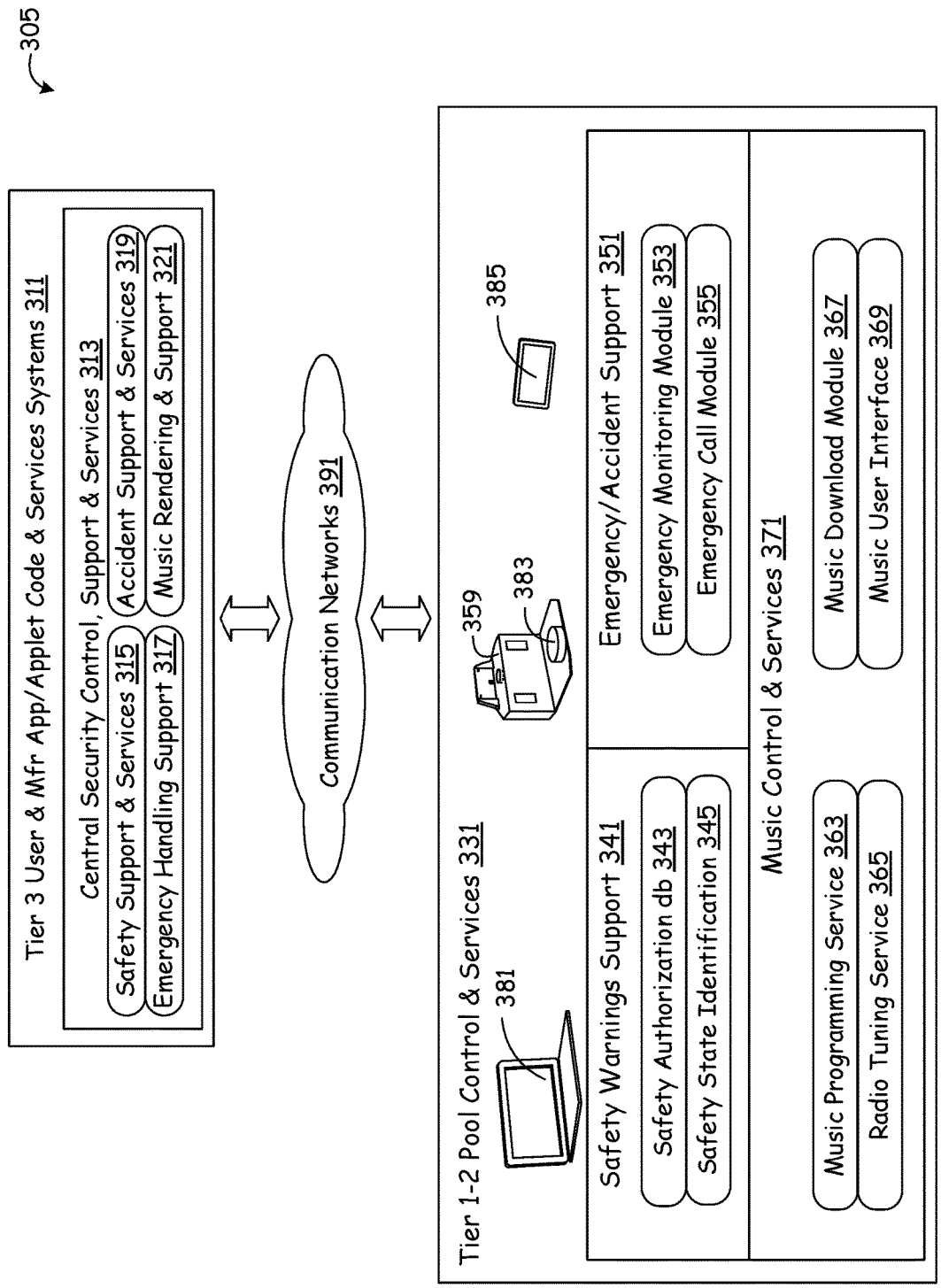
FIG. 3 is a perspective block diagram illustrating tier 1-2 pool control and services of FIG. 1, in detail.

FIG. 3 is a perspective block diagram illustrating tier 1-2 pool control and services of FIG. 1, in detail. These intermediate tiered control and management units (tier 1-2 pool control and services 331) include laptop or personal computers 381, custom built pool control and management systems 359 (with a pluggable and detachable processing or brain unit 383) and smartphones (or similar looking custom built pool control and management systems) 385. These tier 1-2 pool control and services 331 have user interfaces that allow the users to access data contents and management controls of the tier 0-2 pool mobile units 141 (of FIG. 1) and the tier 3 user and manufacturer app/applet code and services systems 111 (of FIG. 1). The user may, for example, input the pool temperature to be set at certain temperature, upon arrival of some specific swimmer or at a particular time. Keeping the pool heated all the time is waste of energy, for that matter.

The tier 1-2 pool control and services 331 consists of safety warnings support 341, emergency/accident support 351 and music control and services 371. The safety warnings support 341 in turn consists of safety authorization database 343 and safety state identification 345. The safety authorization database 343 contains names, priorities and health conditions of all the users of the pool, so that both the general and swimmer specific safety warnings can be generated and delivered to the tier 0-2 pool mobile units (141 of FIG. 1). The safety state identification 345 supports and assists the functionalities of the tier 0-2 pool mobile units (141 of FIG. 1).

The emergency/accident support 351 consists of emergency monitoring module 353 and emergency call module 355. The emergency monitoring module 353 gathers sensor data from the tier 0-2 pool mobile units (141 of FIG. 1), such as images and videos, "help me . . . " or other similar emergency calls and noises for help via microphones, etc. and determines when a true emergency situation occurs, so that appropriate actions can be taken. The emergency call module 355 initiates calls to various authorities as well as family members (when they are on vacation, for example).

The music control and services 371, probably is the most active module for all the times since other modules get activated only during specific situations. Its submodules include music programming service 363, radio tuning service 365, music download module 367 and music user interface 369. The music programming service 363 and radio tuning service 365 allow the users to set their favorite music and radio stations, respectively. The music download module 367 downloads music from various online sources, as directed by the users, including tier 3 user and manufacturer app/applet code and services systems 311, by setting up accounts with them and paying money automatically. The music user interface 369 allows the users to configure the laptop or personal computers 381, custom built pool control and management systems 359 or smartphones 385, as well as the tier 0-2 pool mobile units 141 (of FIG. 1) and tier 3 user and manufacturer app/applet code and services systems 111 (of FIG. 1), for various users (swimmers) related personalization.

The tier 3 user and manufacturer app/applet code and services systems 311 consists of central security control, support and services 313, which in turn consists of safety support and services 315, emergency handling support 317, accident support and services 319 and music rendering and support 321. They assist the tier 1-2 pool control and services 331 in a variety of ways, as explained above and with reference to the FIG. 1. The communication between both the tier 1-2 pool control and services 331 and the tier 3 user and manufacturer app/applet code and services systems 311 occurs via communication networks 391, which include internet, intranet and household wired or wireless communication networks.

Figure 4:
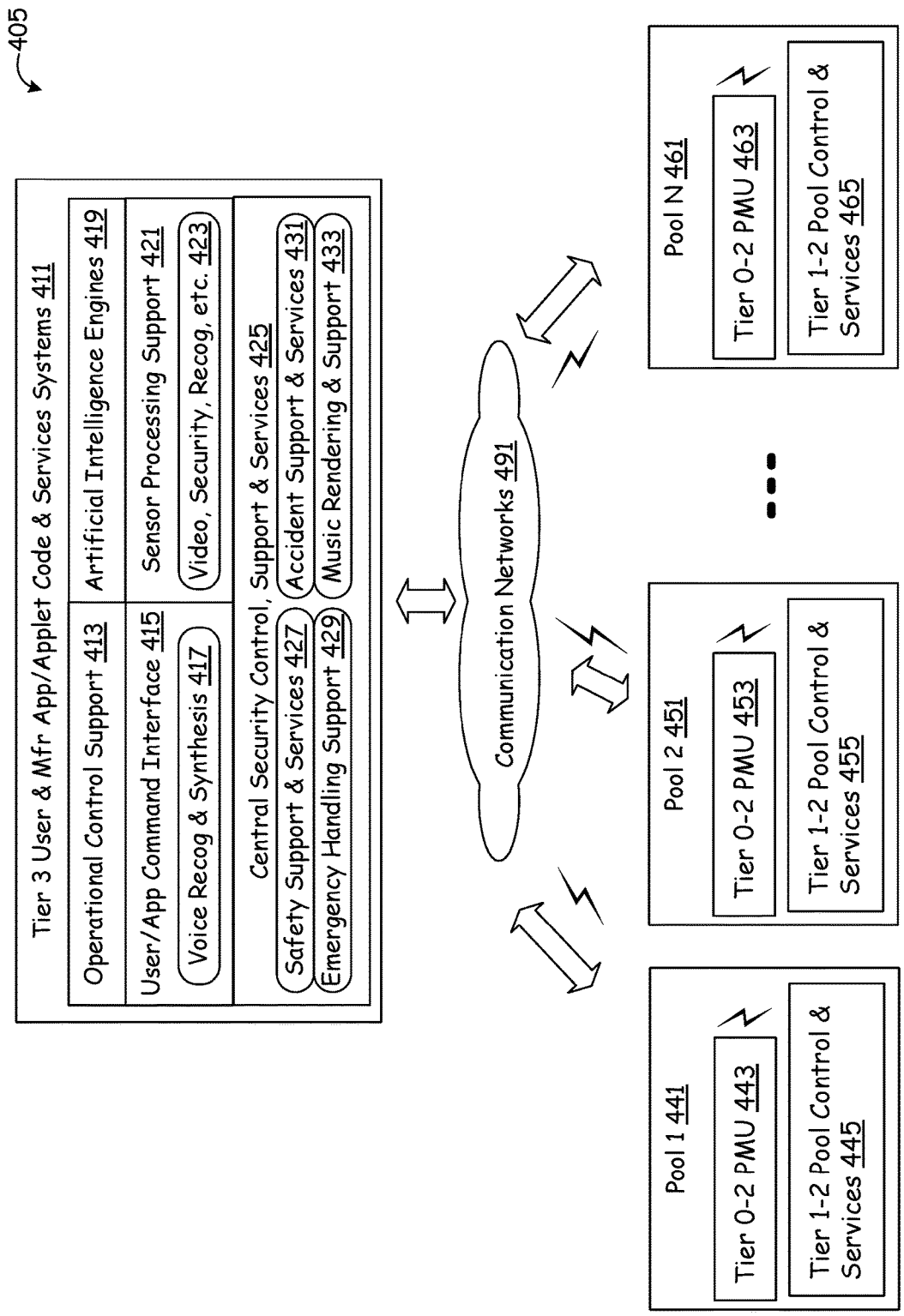
FIG. 4 is a perspective block diagram illustrating the pool mobile unit infrastructure, wherein a tier 3 cloud system manages a plurality of swimming pools, by managing pool mobile units residing there, at the same time.

FIG. 4 is a perspective block diagram illustrating the pool mobile unit infrastructure 405, wherein a tier 3 cloud system manages a plurality of swimming pools, by managing pool mobile units residing there, at the same time. The tier 3 user and manufacturer app/applet code and services system 411 manages a plurality of tier 0-2 pool mobile units (PMU) 443, 453 and 463, while also supporting tier 1-2 pool control and services 445, 455 and 465, at swimming pools pool 1 441, pool 2 451 and pool N 461, respectively. Communication networks 491, which include any of the internet, intranet and wired and/or wireless, makes communication between the tier 3 user and manufacturer app/applet code and services system 411 and pool mobile units 443, 453 and 463, and pool control and services 445, 455 and 465 possible.

The tier 3 user and manufacturer app/applet code and services systems 411 provide control, support and services for the pool mobile units 443, 453 and 463 and pool control and services 445, 455 and 465 via operational control support 413, user/app command interface 415, artificial intelligence engines 419, sensor processing support 421 and central security control, support and services 425.

The user/app command interface 415 in turn contains voice recognition and synthesis 417, and the sensor processing support 421 consists of video, security, recognition, etc. module 423. The voice recognition and synthesis 417 makes recognizing the individual swimmer and authenticating him or her possible as well. Moreover, the tier 3 user and manufacturer app/applet code and services systems 411 also contain central security, support and services 425. The central security, support and services 425 contains safety support and services 427, emergency handling support 429, accident support and services 431 and music rendering and support 433.

For example, the manufacturer of the pool mobile units 443, 453 and 463 may set up a server 411 at few regions of the world, and the users of the 443, 453 and 463 are requested to buy the pool control and services 445, 455 and 465 units, either by downloading them or purchasing them right away. Furthermore, the manufacturer may request the users to register with the server 411, via the pool control and services 445, 455 and 465 units and configure both their pool mobile units 443, 453 and 463 and accounts at the server 411. Once the configuration is set up, the pool mobile units 443, 453 and 463, pool control and services 445, 455 and 465 units as well as the server 411 gain experiences of the users who use the pools (swimmers) pool 1 441, pool 2 451 and pool N 461, respectively. The tier 3 user and manufacturer app/applet code and services systems 411 also contain databases (not shown) to store and utilize user preferences as well as the learnt experiences of the users. These data parameters gained over prolonged uses allow the entire infrastructure 405 to anticipate events and provide individual swimmer and bystander (entire family, in general) based safety, emergency/accident, music, pool cleaning and management and other supports.

Figure 5:
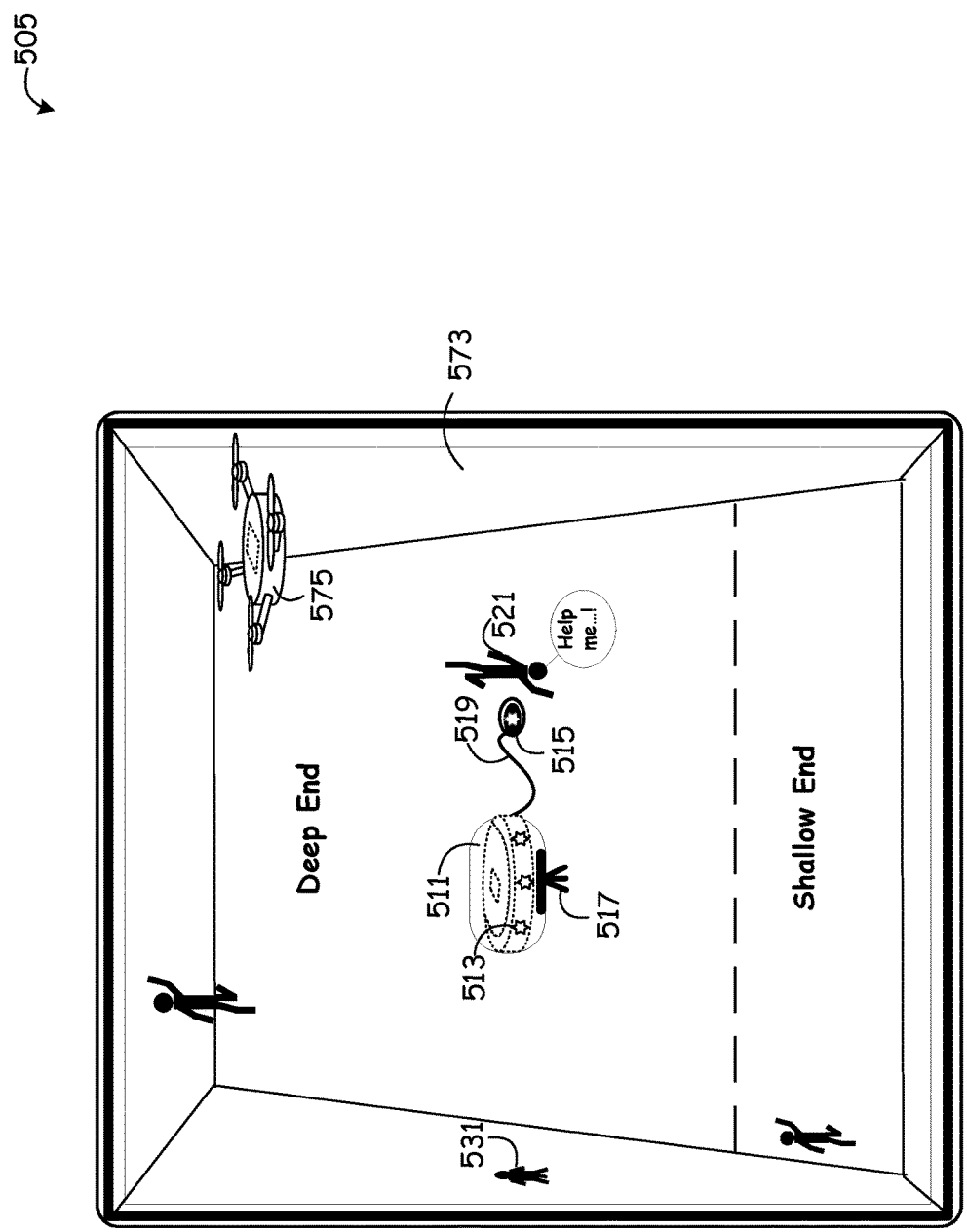
FIG. 5 is a perspective block diagram illustrating functionalities of an exemplary pool mobile unit when placed in a swimming pool, wherein the pool mobile unit assists a swimmer in an emergency situation.

FIG. 5 is a perspective block diagram illustrating functionalities of an exemplary pool mobile unit 511 when placed in a swimming pool 573, wherein the pool mobile unit 511 assists a swimmer 521 in an emergency situation. The swimming pool 573 illustrated could be a pool in the backyard of a typical house, having a slope at the bottom with a shallow end at one side and deep end at another. The illustration depicts three swimmers of a family or their friends, along with their entire history of interactions at the swimming pool and with a history of illnesses and weaknesses being stored at the cloud system databases. This data (at the databases) of individual swimmers is helpful in generating the right kind of responses for every type of safety related or emergency/accident situation, also to deliver music of their liking, and personalize the pool mobile unit infrastructure 505 in other ways. The illustration also depicts a pet 531 fallen in the water.

When one of the family members 521 finds it hard to breath and hence to swim, because of an illness (such as epilepsy or allergy), for example, the pool mobile unit's 511 microphone (depicted in the sensor and emitter panel 513) picks up the "help me . . . " cry for help and its camera picks up signs of difficulties while swimming.

However, the pool mobile unit 511 may not be equipped with a processing capability (as is the case with some of the simpler pool mobile units 511, by design) when it senses signs of difficulties while swimming. In such a scenario, the tier 1-2 pool control and services 161 (of FIG. 1) or tier 3 user and manufacturer app/applet code and services 111 (of FIG. 1), soon as they receive these sensed difficulties while swimming, begin to process them and an emergency related task is initiated.

In any case, the pool mobile unit 511, having propellers 517 for movement or mobility, after the emergency task is initiated, quickly moves toward the struggling family member 521 and releases tethered 519 airbag 515 toward the family member 521. Once the family member 521 securely holds onto the airbag, the pool mobile unit 511 slowly moves toward the shallow end or edge of the pool 573. At the same time, depending upon the swimming experience and illness history of the family member 521, the pool mobile unit 511, along with the tier 1-2 pool control and services 161 (of FIG. 1) or tier 3 user and manufacturer app/applet code and services 111 (of FIG. 1), initiates tasks to inform family members by loudly alerting the fact that the family member 521 being in danger, such as "Robert is suffering from an allergy attack, he is being pulled toward the shallow end, please come and assist him, please do the following . . . " In addition, depending upon the seriousness of the condition, the pool mobile unit 511 informs the hospital where he had been treated before.

In all these situations, the pool mobile unit 511 may also summon the assistance of a drone 575. The drone 575, in one embodiment, is the first one to identify the struggling swimmer 521 and inform the pool mobile unit 511 and initiate emergency related task. Finally, in a related embodiment, the pool mobile unit 511 also identifies pets 531 fallen in the pool and pushes the pet 531 away toward the pool 573 edge, if it picks up signs of an emergency.

Figure 6:
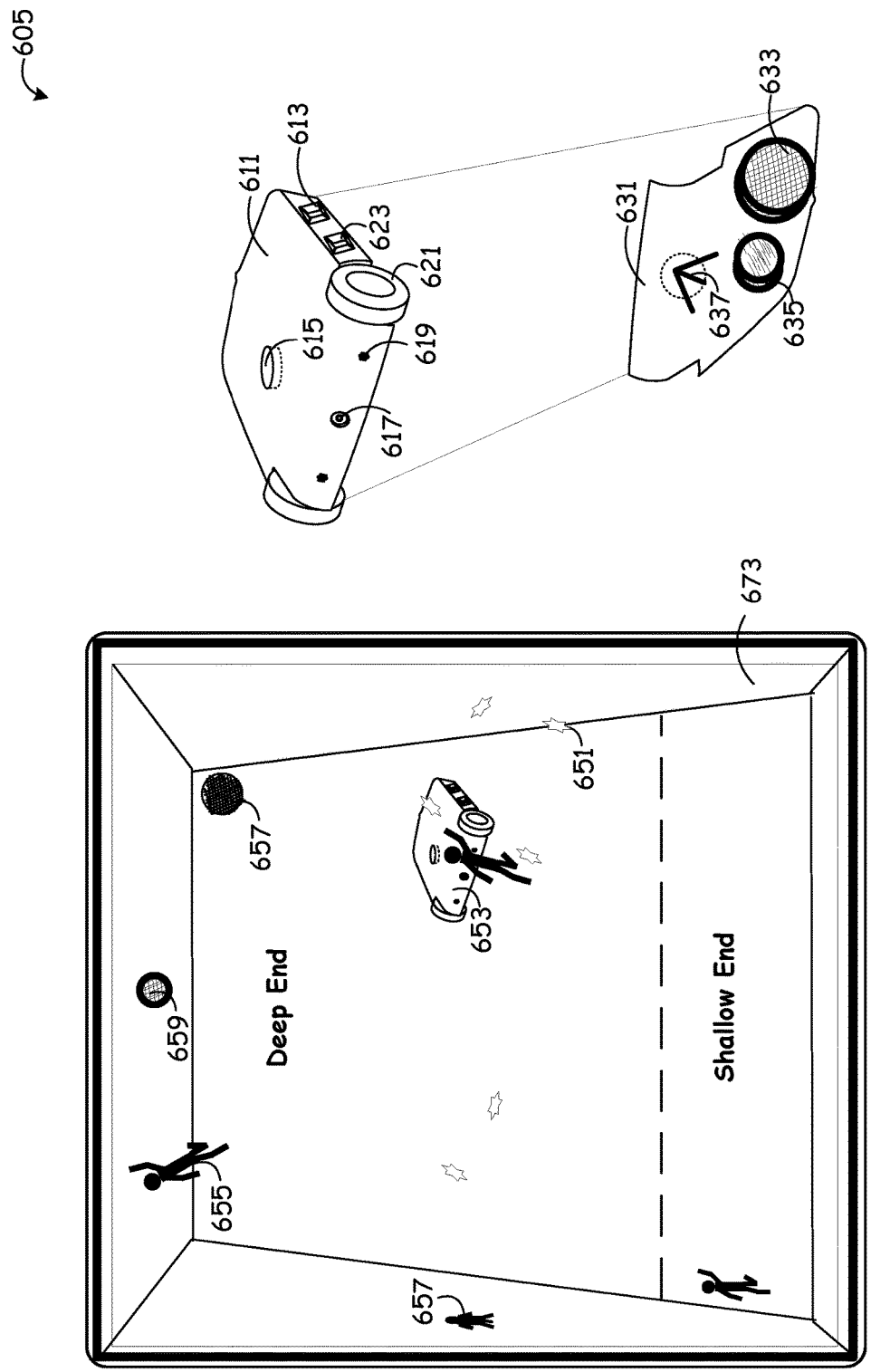
FIG. 6 is a perspective block diagram illustrating functionalities of an exemplary pool mobile unit when placed in a swimming pool, wherein the pool mobile unit scrubs and cleans the swimming pool, removes fallen leaves and other objects, controls the recycling of water and emission of cleaning agents, and performs everyday management related chores.

FIG. 6 is a perspective block diagram illustrating functionalities of an exemplary pool mobile unit when placed in a swimming pool 605, wherein the pool mobile unit scrubs and cleans the swimming pool, removes fallen leaves and other objects, controls the recycling of water and emission of cleaning agents, and performs everyday management related chores. During the times when the swimming pool 673 is not in use, the submersible pool mobile unit 653 propels to the bottom of the pool 673, and scrubs and cleans the bottom surface of the pool 673. Even during the times when pool 673 is in use, but no emergency task is initiated, the submersible pool mobile unit 653 cleans the bottom surface (as depicted in the figure) and walls of the pool 673.

In one configuration, the submersible pool mobile unit 653 performs a plurality of secondary tasks of mundane pool 673 management, such as: a) removing fallen leaves and other objects both on the surface and at the bottom of the pool 673; b) picking up valuables from the bottom of the pool 673, or alerting the swimmers and family members about the fallen valuable; c) draining or recycling the pool 673 water once in a while, via the water outlet 657 and inlet 659, by electronically controlling the valves, during unused times such as during the night; d) emitting chlorine and other chemical agents into the pool 673 water, to get rid of disease causing microbes; e) scrubbing and cleaning the bottom and side surfaces of the pool 673, to remove settled dirt and fungus; and so forth.

The submersible pool mobile unit 653 also does primary tasks such as monitoring the swimmers 655, bystanders and pets 657. The submersible pool mobile unit 653 also contains airbag for emergencies and can deploy it in an emergency. Its primary functions include delivering safety warnings/music and attending emergency and accident circumstances. The submersible pool mobile unit 653 also takes images and videos both under water and on the surface, when requested.

To perform the abovementioned tasks, the submersible pool mobile unit 611 contains a pluggable and detachable processing unit (or brain unit) 615, chlorine and other chemical cleaning agent emitters 613, speakers 623, microphones and other sensors 619 and flash light and video camera 617. In one configuration, the submersible pool mobile unit 611 also contains wheels 621 to be able to move on the bottom surface of the pool 673. At the bottom side 631 of the submersible pool mobile unit 611, there are propellers 637 (to move on the surface of and under the water), scrubber 635 and vacuuming suction hole 633. The submersible pool mobile unit 653 is designed to be mobile under the water. The entire submersible pool mobile unit 653 is sealed hermetically, except the wheels 621, propellers 637, scrubbers 635 and some emitters 613, 623.

Figure 7:
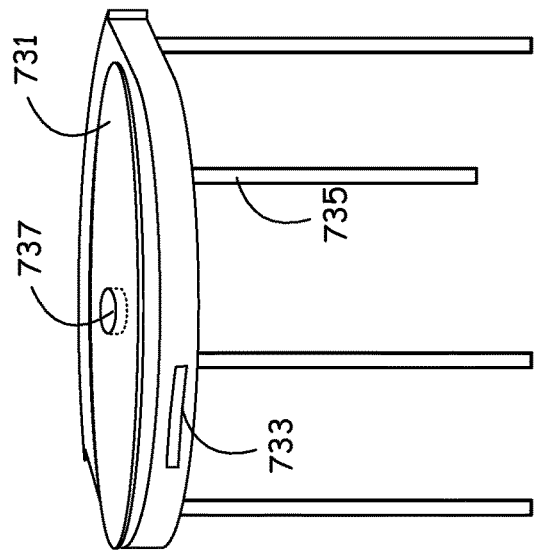
FIG. 7 is a schematic diagram illustrating constructional details of an exemplary pool mobile unit of the FIG. 1.
Figure 7:
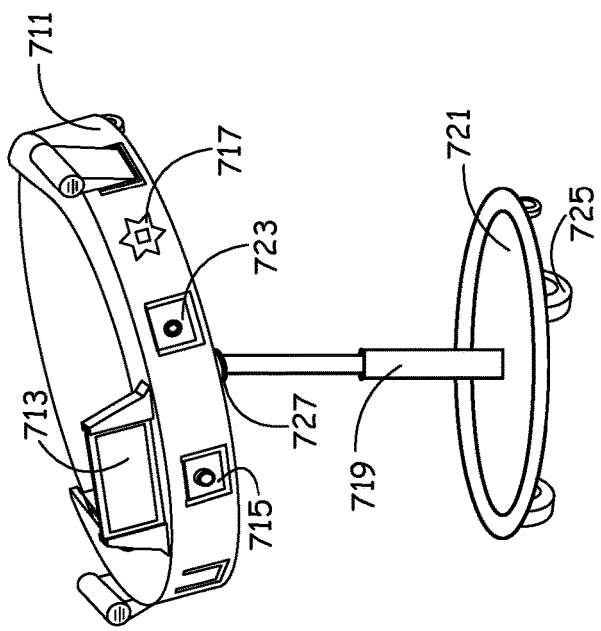

FIG. 7 is a schematic diagram illustrating constructional details 705 of an exemplary pool mobile unit of the FIG. 1. Hardware of the pool mobile unit 711 is configured to meet certain requirements of a poolside mobile unit. The pool mobile unit 711 moves around the pool, all the while observing the swimmers and family members, and raises a flag (initiating a relevant task) when it sees any developments that are out of the ordinary and takes relevant actions. In order to take these actions, the pool mobile unit 711 utilizes the experiences (programming, configuration and learnt knowledge, combined) of the entire system, that includes experiences of the tier 1-2 pool control and services 161 (of FIG. 1), tier 3 user and manufacturer app/applet code and services 111 (of FIG. 1) and the pool mobile unit 711 itself.

In general, there are two hardware entities to the construction of a poolside mobile unit. They are, the pool mobile unit 711 itself, and a docking system 731 that not only charges the batteries of the pool mobile unit 711 but also acts as the tier 1-2 pool control and services 731 (or, 161 of FIG. 1). All communication from and to the pool mobile unit 711 pass through tier 1-2 pool control and services 731, and many of the actions are carried out by the processing of the tier 1-2 pool control and services 731 as well. The depiction shows construction of both the pool mobile unit 711 and tier 1-2 pool control and services 731.

The pool mobile unit 711 has a base 721 with motorized wheels 725 at the bottom side. This allows the pool mobile unit 711 to wander around freely, by the walls of the pool. It has a motorized telescopic leg 719, that allows the height of the pool mobile unit 711 to be adjusted. This is an automatic process, wherein the pool mobile unit 711 adjusts its own height for better visibility of an area it is trying to observe. Furthermore, there is an automatic rotation and tilting mechanism 727, that allows the pool mobile unit 711 tilt by its sides and also rotate 360 degrees. The depiction shows a slightly tilted pool mobile unit 711.

In addition, the pool mobile unit 711 has a pluggable and detachable processing unit (brain unit) 713, that in conjunction with the tier 1-2 pool control and services' 731 processing unit (brain unit) 737 perform most of the tasks, in everyday circumstances. Then, it also has pluggable and detachable video camera along with a flash light 715, microphone and other sensors 723 and speaker (emitters, in general) 717.

The tier 1-2 pool control and services 731 has a contactless induction charging port 733 and four legs 735. The pool mobile unit 711 and tier 1-2 pool control and services 731 are hermetically sealed for protection against elements of nature, such as water from swimming pool and rain as well as wind and dust. The pool mobile unit 711 and tier 1-2 pool control and services 731 communicate between each other via a wireless connection such as Wi-Fi or Bluetooth®.

Figure 8:
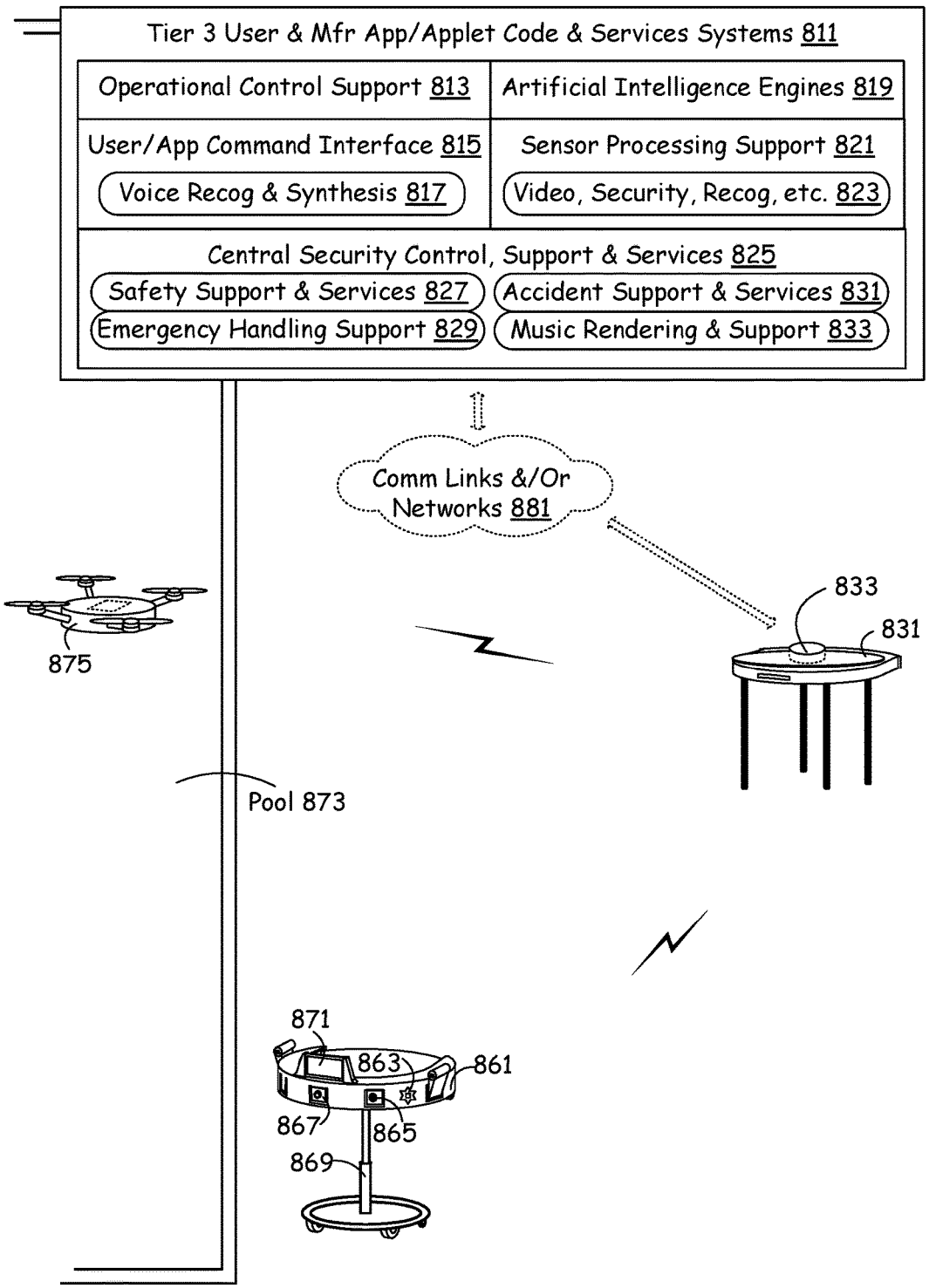
FIG. 8 is a schematic diagram illustrating an exemplary pool mobile unit of FIG. 7 in real-life everyday usage circumstances.

FIG. 8 is a schematic diagram illustrating an exemplary pool mobile unit of FIG. 7 in real-life everyday usage circumstances 805. The pool mobile unit 861 depicted is not submersible, however it wanders all around the pool 873, all the while monitoring for anything unusual that pertains to safety, emergencies and accidents. The monitoring involves a plurality of sensors, including a video camera with a flash light 867, a sensor unit 865 that includes a microphone. The sensors 867, 865, while monitoring, specifically look for voice recognition of emergency call such as a shouting "help me . . . ," raised pitch that resembles an emergency, accident and so forth. Also, sensors 867, 865 also look for safety, emergency and accident related circumstances via the camera 867, that includes sensing red color of blood and so forth.

All the information from multiple sensors 867, 865 are combined and analyzed (processed) to determine whether an unusual situation pertains to safety, emergency or accident. This processing in real-life includes not just processing unit 871 and programs of the pool mobile unit 861, but also processing unit 833 and programs of the docking system 831, that acts as a tier 1-2 pool control and services 161 (of FIG. 1) and tier 3 user and manufacturer app/applet code and services 811.

When the battery is low, the pool mobile unit 861 moves closer to the docking system 831, facing its charging coil to the charging coil of the docking system 831 for recharging. The recharging is done during idle times, mostly during night, to avoid missing any safety, emergency and accident situations.

In one embodiment of the present invention, the pool mobile unit 861 works to monitor safety, emergencies and accidents in conjunction with a drone 875, wherein when the monitoring from a distance becomes difficult, it summons the drone 875 to monitor the safety, emergency and accident situation from up close. The drone 875, which also contains a plurality of sensors, from up close looks for the abovementioned signs and provides additional inputs to the docking system 831 (tier 1-2 pool control and services) and tier 3 user and manufacturer app/applet code and services 811.

The pool mobile unit 861 also consists of a motorized telescopic leg 869 for better visibility, if there are any obstructions in the view. The pool mobile unit 861, drone 875 and docking system 831 communicate between each other via a wireless connection such as Wi-Fi or Bluetooth®. The communication between the tier 1-2 pool control and services 831 and tier 3 user and manufacturer app/applet code and services 811 occurs via a communication links and/or networks 881.

The tier 3 user and manufacturer app/applet code and services systems 811 comprises operational control support 813, user/app command interface 815, artificial intelligence engines 819, sensor processing support 821 and central security control, support and services 425. The user/app command interface 815 in turn comprises voice recognition and synthesis 817, and the sensor processing support 821 comprises of video, security, recognition, etc. module 823. Moreover, the tier 3 user and manufacturer app/applet code and services systems 811 also contain central security, support and services 825. The central security, support and services 825 contains safety support and services 827, emergency handling support 829, accident support and services 831 and music rendering and support 833.

Figure 9:
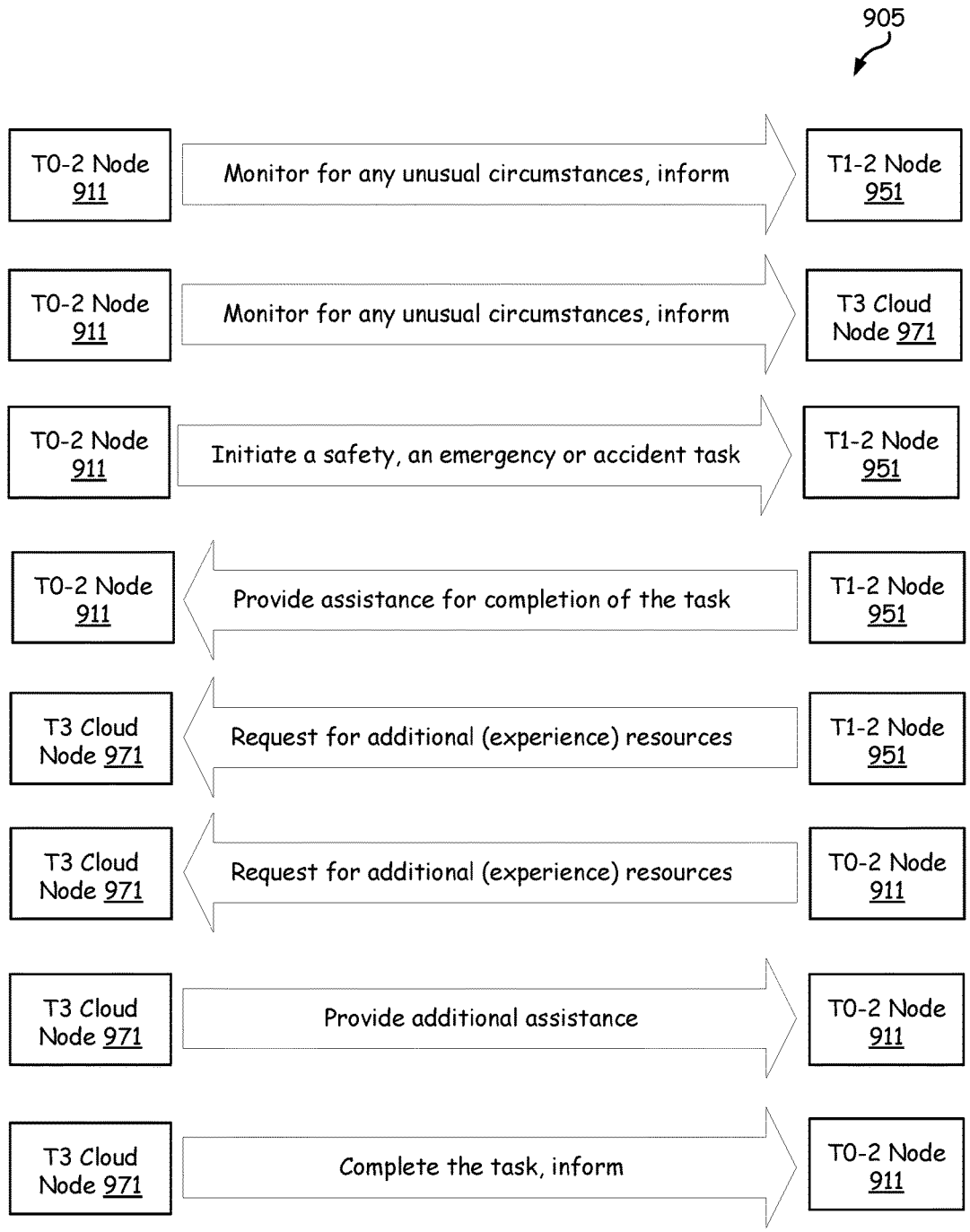
FIG. 9 is a schematic diagram illustrating the processes involved when a safety, an emergency or accident context arises within the pool mobile unit infrastructure of the FIG. 1.

FIG. 9 is a schematic diagram illustrating the processes involved 905 when a safety, an emergency or accident context arises within the pool mobile unit infrastructure of the FIG. 1. The processes begin with the T0-2 node (pool mobile unit) 911 monitoring the pool and surrounding areas for any unusual events, for which there are preset rules. When such circumstances arise (that warrants a trigger, set in terms of preset rules), the T0-2 node 911 informs both T1-2 node (tier 1-2 pool control and services of the FIGS. 1) 951 and T3 cloud node (tier 3 user and manufacturer app/applet code and services of the FIG. 1) 971.

Then, the T0-2 node 911 initiates a task that pertains to a safety, or an emergency, or accident task, and that task triggers a specific routine in T1-2 node 951. The priorities are set based on the event that raises the trigger, the safety task being a lowest priority routine, emergency task being an intermediate priority routine and accident task being the highest priority routine.

For example, slippery pool edges, because of freshly fallen rain, constitutes a safety trigger when the family members arrive near the swimming pool. An asthma attack in the swimming pool constitutes an emergency (for example, excessive chlorine in the water can trigger asthma in some people). Furthermore, by obliviousness, a child diving into the pool at a shallow end and hitting his or her head against the bottom, and getting seriously hurt that way, constitutes an accident.

Initially, for less serious cases, the T1-2 node 951 provides assistance to the T0-2 node 911 and attempts resolve the issue (without involving the T3 cloud node 971). However, if the issue is not resolved by the T1-2 node 951, either or both the T0-2 node 911 and T1-2 node 951 request for additional experiences (resources) from the T3 cloud node 971. The experiences comprise programming (which involves the programmer's experiences), user set configurations and knowledge gained by the T3 cloud node 971, put together. For example, an infrequent visitor (may be a family friend) may have fear of deep waters and wishes to swim only in the shallow end of the pool. The pool mobile unit infrastructure learns this by observing the family friend's behavior and this constitutes experience pertaining to that person. This knowledge or experience is useful during an instance of safety, emergency or accident. This experience is stored in the databases at T0-2 node 911, T1-2 node 951 and/or T3 cloud node 971. Finally, the T0-2 node 911 receives additional assistance and that completes the task.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

Although the present invention has been described in terms of GPS coordinates/and navigational information communication involving mobile phones and computers, it must be clear that the present invention also applies to other types of devices including mobile devices, laptops with a browser, a hand held device such as a PDA, a television, a set-top-box, a media center at home, robots, robotic devices, vehicles capable of navigation, and a computer communicatively coupled to the network.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

It should be clear that the term "pool mobile unit" used herein includes aquatic, vehicles, driver-assisted aquatic mobility vehicles, driver-less aquatic vehicles, etc. It also includes a self-drive aquatic vehicle or a driver assisted aquatic vehicle. The pool mobile units 141, pool mobile unit 511, pool unit 611 across the figures could be configured features and capabilities described herein. All of the concepts herein could be included in pool mobile units configured to be passenger or passenger-less aquatic vehicles, self-driver aquatic vehicle, driver assisted aquatic vehicle, swimming equipment, and sea mobility equipment.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An electronic system, comprising:
a pool mobile unit, that functions in and around a swimming pool, comprising:
a plurality of sensors;
a plurality of emitters; and
a processing unit;
the sensors collect data in and around the swimming pool;
the processing unit processes the collected data; and the pool mobile unit thereby performs its duties, comprising:
   providing safety, emergency and accident assistance for the swimmers; and
   cleaning the pool.

2. The electronic system of claim 1, wherein the pool mobile unit comprises a submersible pool mobile unit.

3. The electronic system of claim 2, wherein one of the submersible pool mobile unit's plurality of emitters emits cleaning agents in the swimming pool to sanitize water.

4. The electronic system of claim 1, wherein the pool mobile unit comprises a land based mobile unit.

5. The electronic system of claim 1, wherein the electronic system further comprising a docking system.

6. The electronic system of claim 5, wherein the docking system comprises a charging unit, to recharge the batteries of the pool mobile unit.

7. The electronic system of claim 5, wherein the docking system further comprises an intermediate tiered processing unit.

8. The electronic system of claim 7, wherein the intermediate tiered processing unit processes data for the pool mobile unit.

9. The electronic system of claim 7, wherein the intermediate tiered processing unit facilitates the communication between the pool mobile unit and a cloud based server system.

10. The electronic system of claim 1, wherein the pool mobile unit comprises a robot.

11. A method performed by a pool mobile unit, when it encounters an unusual circumstance, the method comprising:
   initiating a safety, an emergency or accident task;
   requesting for additional processing assistance from an intermediate tiered node;
   requesting for additional experience based processing assistance from a cloud based higher tiered node; and
   completing the safety, emergency or accident task.

12. A submersible mobile unit configured for deployment within a swimming pool, the submersible mobile unit comprising:
   a cleaning element;
   at least one sensing element that at least assists in detecting an emergency situation within the swimming pool; and
   a communication element that is configured to send a notification seeking assistance relating to the emergency situation.

13. The submersible mobile unit of claim 12, further comprising an assistance element in an attempt to address the emergency situation.

14. The submersible mobile unit of claim 12, wherein the communication element comprises a wireless communication element.

15. The submersible mobile unit of claim 12, wherein the notification is sent to alert humans near the swimming pool.

16. The submersible mobile unit of claim 12, wherein the notification is sent to alert emergency service personnel.

17. The submersible mobile unit of claim 12, wherein the communication element is configured to interact with at least one system of a multi-tiered swimming pool management infrastructure.

18. The submersible mobile unit of claim 12, further comprising an entertainment element.

19. The submersible mobile unit of claim 14, wherein the wireless communication element is configured to interact with a support unit.

20. The submersible mobile unit of claim 19, wherein the support unit is disposed within or near the swimming pool.

* * * * *